(12) United States Patent
Gulminelli

(10) Patent No.: US 12,709,039 B2
(45) Date of Patent: Aug. 18, 2026

(54) APPARATUS AND METHOD FOR CUTTING A THERMOPLASTIC PIPE

(71) Applicant: SICA S.P.A., Alfonsine (IT)

(72) Inventor: Marco Gulminelli, Ravenna (IT)

(73) Assignee: SICA S.P.A., Alfonsine (IT)

( * ) Notice: Subject to any disclaimer, the term of this patent is extended or adjusted under 35 U.S.C. 154(b) by 50 days.

(21) Appl. No.: 18/880,697

(22) PCT Filed: Jul. 5, 2023

(86) PCT No.: PCT/IB2023/056958

§ 371 (c)(1),
(2) Date: Jan. 2, 2025

(87) PCT Pub. No.: WO2024/009234

PCT Pub. Date: Jan. 11, 2024

(65) Prior Publication Data

US 2026/0001250 A1 Jan. 1, 2026

(30) Foreign Application Priority Data

Jul. 8, 2022 (IT) ........................ 102022000014470

(51) Int. Cl.
*B26D 3/16* (2006.01)
*B26D 1/16* (2006.01)
(Continued)

(52) U.S. Cl.
CPC ............... *B26D 3/166* (2013.01); *B26D 1/16* (2013.01); *B26D 5/086* (2013.01); *B29C 57/12* (2013.01);
(Continued)

(58) Field of Classification Search
None
See application file for complete search history.

(56) References Cited

U.S. PATENT DOCUMENTS

2015/0048558 A1* 2/2015 Tabanelli ................ B29C 57/02 264/481
2023/0405859 A1* 12/2023 Gulminelli ............... B26D 1/16

FOREIGN PATENT DOCUMENTS

WO 2013140209 A1 9/2013
WO 2022101754 A1 5/2022

OTHER PUBLICATIONS

International Search Report dated Nov. 2, 2023 from counterpart PCT App No. PCT/IB2023/056958.

* cited by examiner

*Primary Examiner* — Mohammad M Ameen
(74) *Attorney, Agent, or Firm* — SHUTTLEWORTH & INGERSOLL, PLC; Timothy J. Klima

(57) ABSTRACT

Apparatus for cutting a thermoplastic pipe, including: a guide for movement along a direction; a unit mobile along the guide; a first actuator for moving the mobile unit along the guide, the mobile unit including a rotation unit to rotate about a thermoplastic pipe; a second actuator for rotating the rotation unit; a locking unit with gripping elements interacting with the pipe and movable between open and closed configurations, the gripping elements and rotation unit coupled to allow, in the closed configuration, longitudinally blocking the rotation unit to the pipe along the direction; a cutting tool, carried by the rotation unit, for cutting the pipe and configured to move radially to the pipe; a third actuator, carried by the rotation unit to move the cutting tool radially to the pipe; a compression device acting on a cut edge of the pipe; a heater for heating the compression device.

19 Claims, 7 Drawing Sheets

(51) Int. Cl.
*B26D 5/08* (2006.01)
*B29C 57/12* (2006.01)
*B29L 23/00* (2006.01)

(52) U.S. Cl.
CPC ................ *B29C 2793/0027* (2013.01); *B29C 2793/0081* (2013.01); *B29L 2023/22* (2013.01)

1
X,A
T
2
20
21
3
30
13
11
12
6
20
21
5

1
12B
12C
12
7
13
A
12A
T

Fig. 7
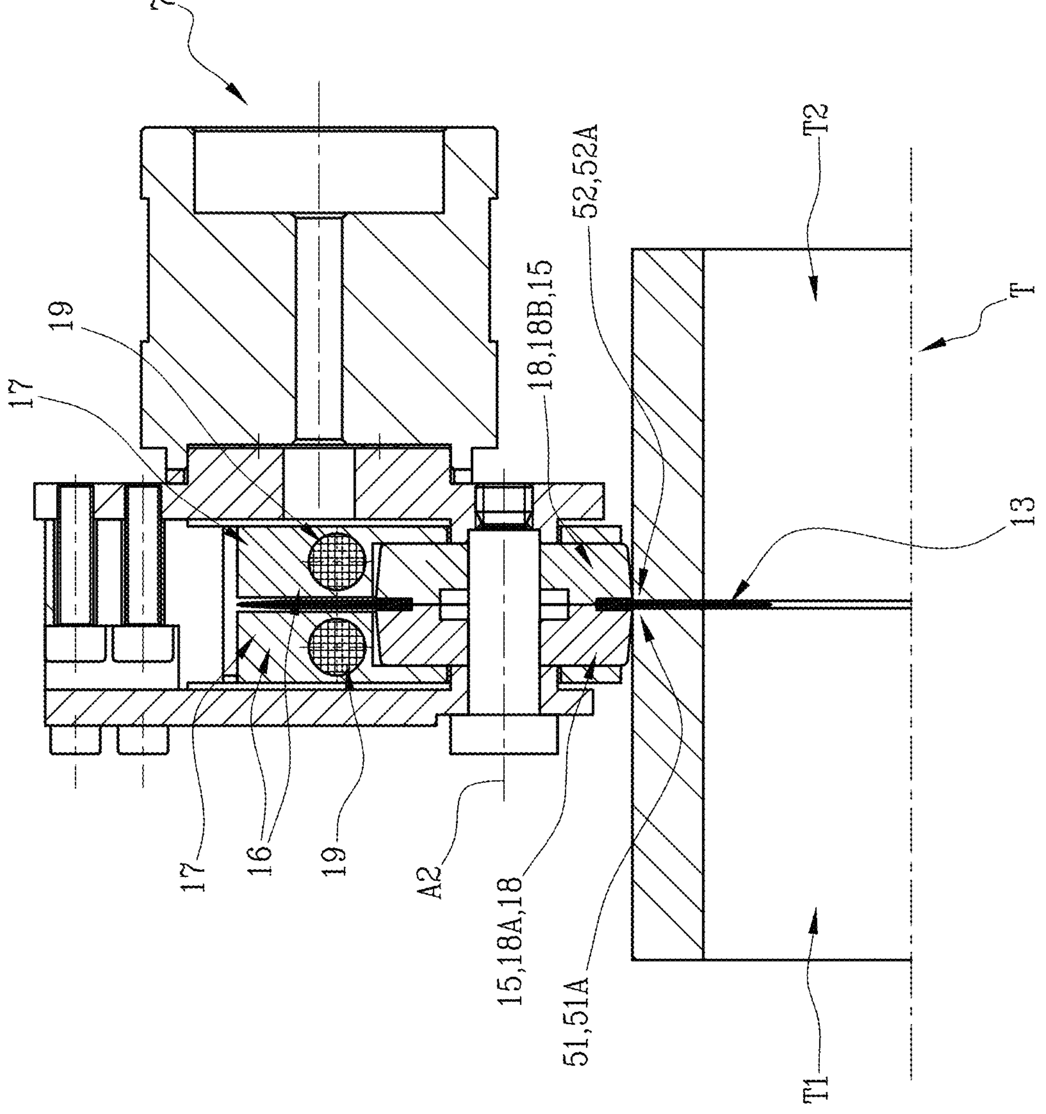

APPARATUS AND METHOD FOR CUTTING A THERMOPLASTIC PIPE

This application is the National Phase of International Application PCT/IB2023/056958 filed Jul. 5, 2023 which designated the U.S.

This application claims priority to Italian Patent Application No. 102022000014470 filed Jul. 8, 2022, which application is incorporated by reference herein.

TECHNICAL FIELD

This invention relates to an apparatus and a method for cutting a pipe made of thermoplastic material.

Thermoplastic pipes are produced by an extrusion process starting from material in the plastic state, using a rotary screw system which forces the material through a calibrated mould of suitable shape and dimensions.

The pipe production plant is known as an extrusion line and it comprises a plurality of apparatuses, each of which designed for a specific function.

In this plant there is usually a cutting apparatus, generally located at the end of the line, configured for dividing the continuously extruded pipe into pieces of defined and predetermined length.

This apparatus comprises a cutting unit (with the cutting tool inserted on it) installed on a movable carriage which, during the cutting operation, is coupled integrally with the extruded pipe by means of the action of clamping means, known as clamps.

In general, the nature of the cutting action depends on the type of thermoplastic material to be cut.

BACKGROUND ART

Amongst the pipes made of thermoplastic material commonly used, many (such as PVC-U, ABS and PMMA) have a fragile type mechanical behaviour and a particularly high hardness. Due to the above-mentioned mechanical features, these materials are typically cut by removal of material with the use of toothed discs or motor-driven grinding wheels. All the drawbacks deriving from this cutting method are well known in the prior art, including the generation of contaminating powders and swarf and the consequent need for their suction, collection and disposal.

The cut by separation of material (for example with a cutting tool) overcomes all the problems linked to the cut by removal of material but, especially in the pipes made of the above-mentioned materials, if they are not cut with specific techniques, the pipe could break up during cutting (with possible damage to the tool) whilst the final quality of the cutting surface could be inadequate and the cut itself might not be clean and precise.

In particular, in order to be able to make cuts of good quality it is necessary to guarantee the perpendicularity of the action of the cutting tool with respect to the surface of the pipe and this may be achieved by using sufficiently rigid tools.

The rigidity of the cutting tool depends on the shape and thickness of the tool itself.

According to the prior art solutions commonly used in the cutting by separation of material, increasing the thickness of the cutting tool in favour of rigidity disadvantageously causes the generation of lips and large deformations on the surface of the pipe, such as to consequently modify the nominal external dimensions.

The lips and the modifications of the nominal dimensions of the pipe may, however, adversely affect the function of the pipe, such as, for example, the possibility of effectively coupling it with other parts for constructing a specific network for supplying fluids, and in general determine a degradation in the quality of the pipe.

DISCLOSURE OF THE INVENTION

The need is felt to overcome the above-mentioned technical drawbacks and in particular to guarantee that the pipes maintain their dimensions and integrity even downstream of a cutting action (with particular reference to the pipes made from thermoplastic materials which have a fragile type mechanical behaviour and a particularly high hardness).

The aim of the invention is to satisfy the above-mentioned need by providing a cutting apparatus and method which allow thermoplastic pipes to be cut, preserving the original dimensions of the pipe and its functions.

BRIEF DESCRIPTION OF DRAWINGS

The technical characteristics of the invention are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 7 is a schematic cross section of the compression means of the embodiment of FIG. 5.

DETAILED DESCRIPTION OF PREFERRED EMBODIMENTS OF THE INVENTION

Figure 1:
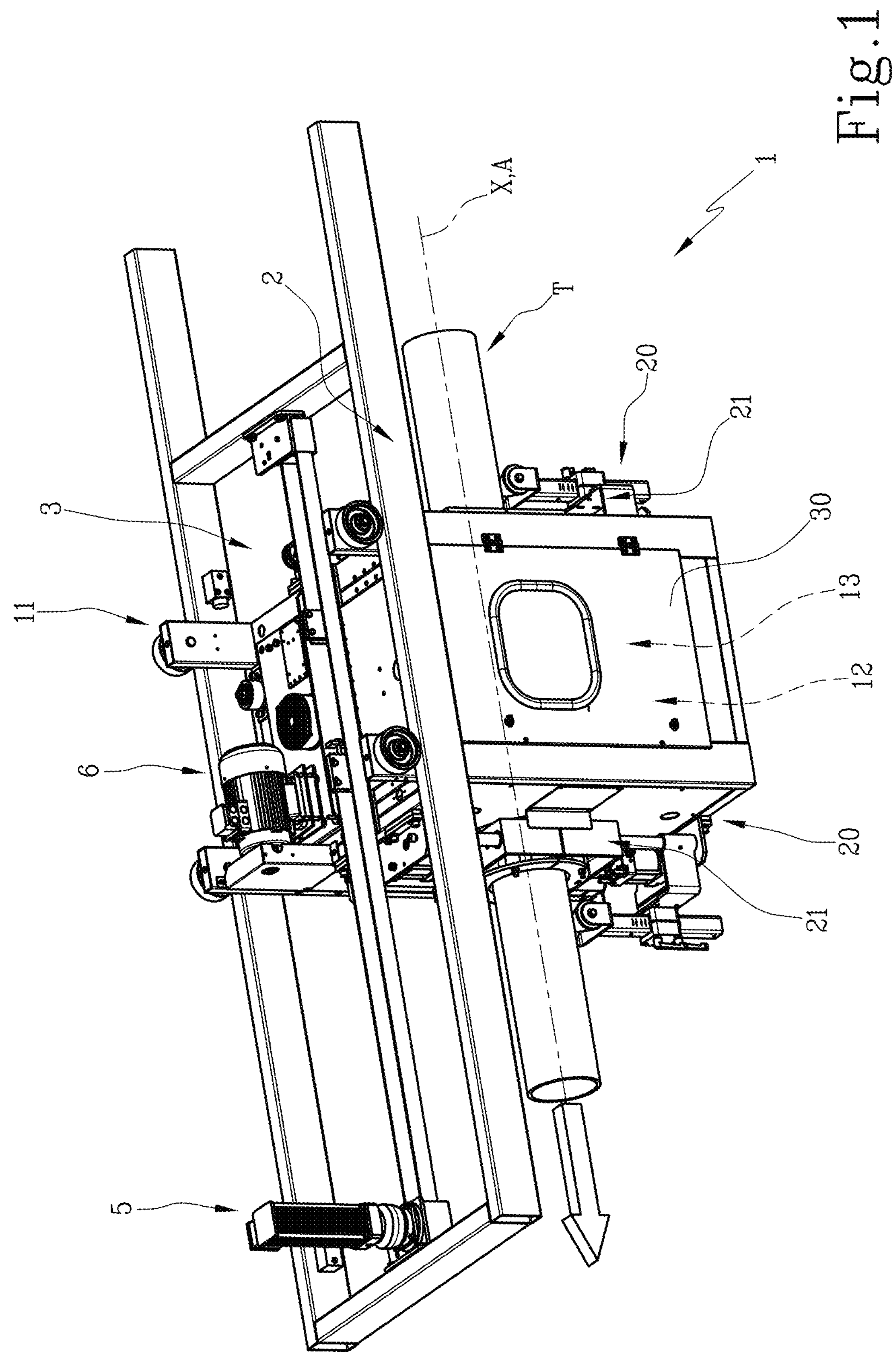
FIG. 1 is a schematic perspective view of an apparatus for cutting a thermoplastic pipe according to the invention.

With reference to the accompanying drawings, the numeral 1 denotes an apparatus for cutting a pipe T made of thermoplastic material, for example a pipe T made of PVC.

Other thermoplastic materials for making pipes T are, for example, PE, PP, PB, ABS and PMMA.

The pipe T extends along the predetermined direction X and has an axis A.

According to an aspect, the cutting apparatus 1 comprises at least one guide 2 for movement along the predetermined direction X.

The apparatus 1 comprises a unit 3 mobile along said guide 2, which moves with respect to the predetermined direction X.

The apparatus 1 comprises a first actuator 5, configured for moving the mobile unit 3 along the guide 2.

The actuator 5 is preferably an electric actuator.

According to other examples, the actuator 5 is of a pneumatic or hydraulic type.

The mobile unit 3 comprises a carriage 11 which allows the movement along the predetermined direction X thanks to the actuator 5.

The mobile unit 3 comprises at least one locking unit 20, equipped with gripping elements 21 interacting with the pipe T.

The gripping elements 21 are movable between an open configuration and a closed configuration.

The gripping elements may be, for example, jaws (the above-mentioned clamps) which allow the locking of the pipe X with respect to the mobile unit 3.

The mobile unit 3 comprises a containment body 30 coupled to the carriage 11.

As illustrated in FIG. 1, the body 30 of the mobile unit 3 is passed through by the pipe T which must be cut.

The mobile unit 3 comprises a rotation unit 12, configured for rotating about the pipe T.

The rotation unit 12 is positioned inside the containment body 30.

Figure 2:
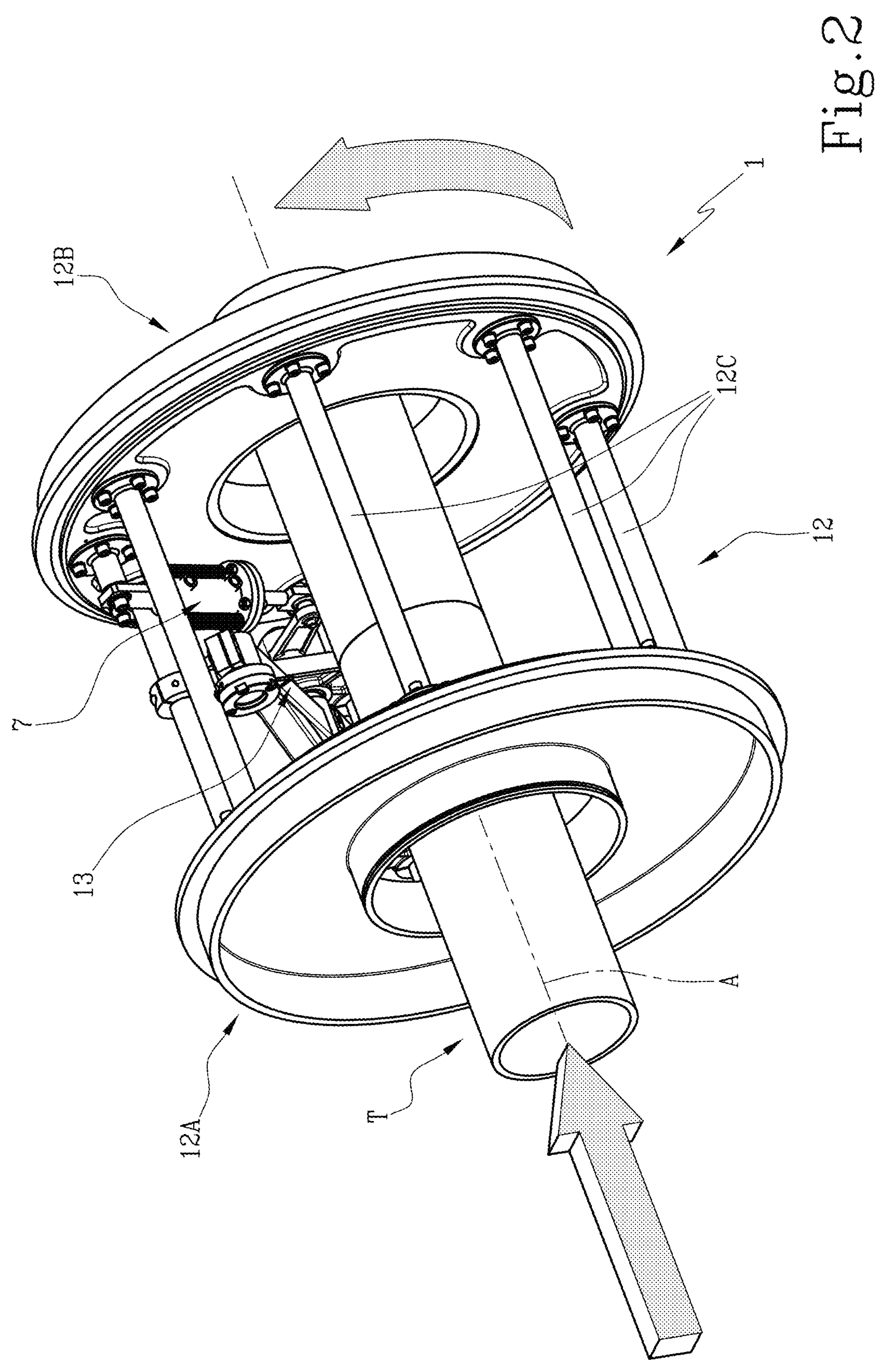
FIG. 2 is a perspective view of a detail of an apparatus for cutting a thermoplastic pipe according to the invention.

According to an embodiment, illustrated for example in FIG. 2, the rotation unit 2 comprises a pair of ring-shaped elements 12A, 12B connected by a plurality of longitudinal bars 12C.

The gripping elements 21 and the rotation unit 12 are coupled in such a way as to allow, in the closed configuration, the rotation unit 12 to be longitudinally constrained to the pipe T along the predetermined direction X.

The rotation unit 12 may therefore rotate about the direction X with respect to the locking unit 20, being, however, constrained to the pipe T in the direction X, that is to say, along the guide 2 during the process for cutting the pipe T.

The mobile unit 3 comprises a second actuator 6, configured for rotating the rotation unit 12 about the pipe T.

The mobile unit 3 comprises a cutting tool 13, carried by the rotation unit 12, for cutting on the pipe T.

The rotation unit 12 acts as a supporting body for the cutting tool 13.

The mobile unit 3 comprises a third actuator 7, carried by the rotation unit 12, operating on the cutting tool 13 for moving the tool 13 radially with respect to the pipe T.

The actuator 7 therefore allows the cutting tool 13 to be moved from a first position at which the tool 13 is not in contact with the pipe T to a second position in which the tool 13 is sunk completely in the pipe T for making the cut.

The cutting tool 13 is therefore configured for moving radially with respect to the pipe T.

The tool 13 rotates about the axis A of the pipe T and simultaneously sinks radially in the pipe T making the cut.

In effect, since the tool 13 is supported by the rotation unit 12, it rotates about the axis A of the pipe T when the rotation unit 12 is rotated about the axis A.

The pipe T is then cut, using the tool 13, into two pieces T1 and T2 which have, respectively, an edge 51 and 52.

Figure 3:
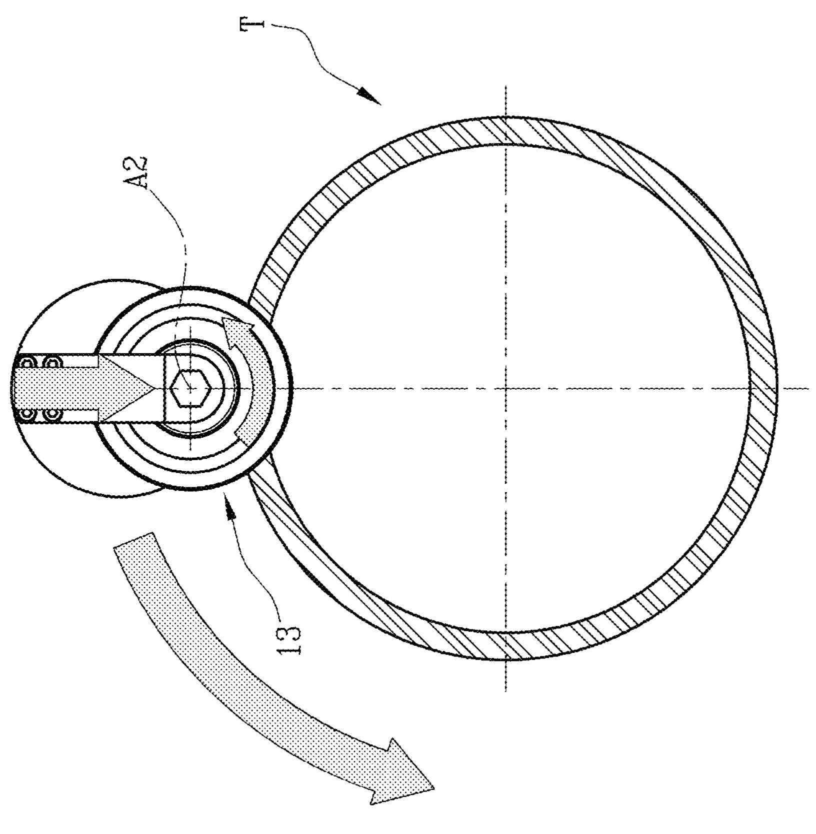
FIGS. 3 and 4 are cross sections of embodiments of a cutting tool of the cutting apparatus of FIG. 1.

According to an embodiment, illustrated in FIG. 3, the cutting tool 13 is a rotating disc blade and it rotates about an axis of rotation A2.

In other words, the tool 13 is preferably an idle disc blade.

Figure 4:
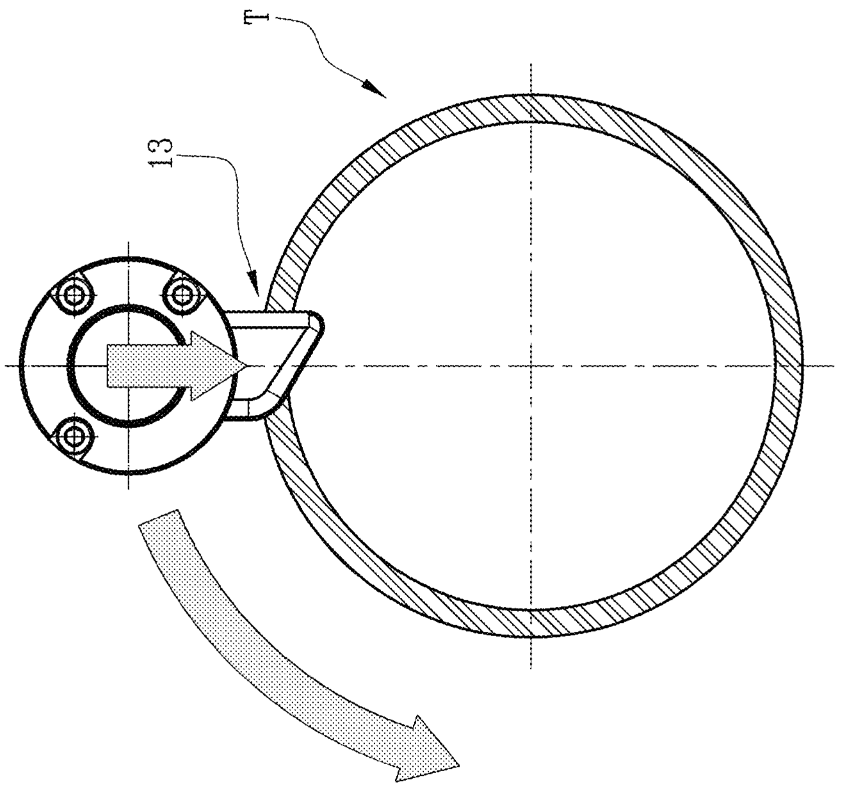

According to an embodiment, illustrated in FIG. 4, the cutting tool 13 is a knife blade.

The mobile unit 3 also comprises an electricity transfer device, preferably of the slip ring type which allows power and signals to be transferred to the rotation unit 12, allowing operation of the third actuator 7.

The mobile unit 3 comprises compression means 15, configured for acting on a cut edge of the pipe T.

The compression means 15 allow the cut edge to be acted on mechanically, that is to say, to locally deform, in such a way as to substantially eliminate any deformations caused by the cutting action.

In particular, the compression means 15 are configured for acting on each cut edge 51, 52 of the pipe T.

It should be noted that the compression means 15 act, simultaneously, both on the end of the piece of pipe cut and on the end during cutting of the continuous pipe upstream of the above-mentioned piece with respect to the extrusion direction.

Preferably, the compression means 15 are associated with the cutting tool 13 and are alongside the tool 13.

In other words, according to a preferred embodiment, the compression means 15 are positioned on opposite sides of the cutting tool 13.

Figure 5:
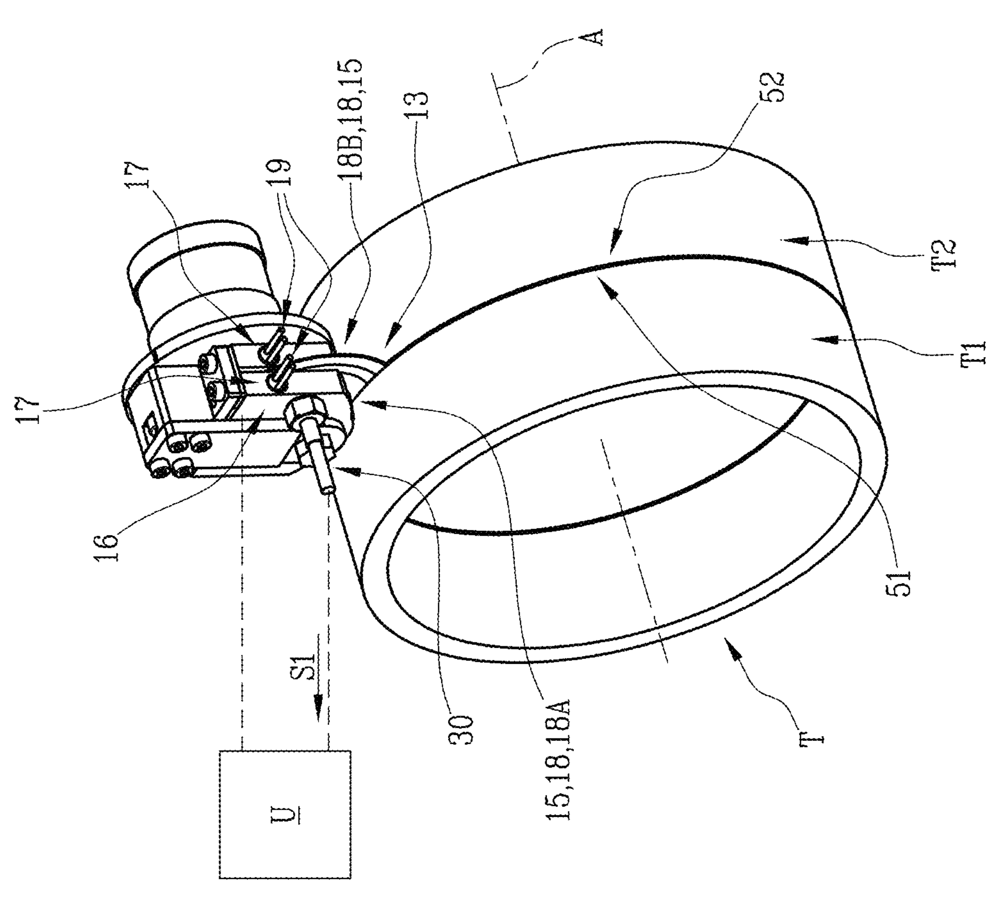
FIGS. 5 and 6 are perspective views of embodiments of compression means of the cutting apparatus.

According to an embodiment illustrated by way of example in FIGS. 5 and 7, the compression means 15 comprise flanges 18.

According to the embodiment illustrated in FIG. 7, the compression means 15, in particular the flanges 18, comprise a first flange 18A and a second flange 18B.

The first flange 18A acts on the edge 51 of the piece of pipe T1 whilst the second flange 18B acts on the cut end of the pipe T2 upstream of the above-mentioned piece with respect to the extrusion direction.

Each flange 18 preferably has a truncated cone shape with the larger base facing towards the cutting tool 13.

The mobile unit 3 comprises heating means 16 configured for heating the compression means 15 to a predetermined temperature.

The compression means 15 are heated to a temperature preferably between 50° and 200° depending on the type of thermoplastic material of the pipe T.

Advantageously, heating the compression means 15 facilitates the action of compressing the deformations and the lips produced by the cutting action.

Preferably, the heating means 16 comprise fixed heating bodies 17.

According to an example, the fixed heating bodies 17 transfer heat to the compression means 15 by sliding contact.

In this case, the compression means 15, and in particular the flanges 18, are heated by conduction.

Each fixed body 17 is rested continuously on an outer surface of the corresponding flange 18.

According to an embodiment, the fixed bodies 17 are coupled to the flanges 18 and are configured to heat the flanges 18 to the predetermined temperature.

According to an embodiment, each fixed body 17 comprises an electrical resistance 19 which determines the heating.

According to an embodiment, the compression means 15 comprise a supporting element 40 configured for also supporting the cutting tool 13.

According to an embodiment, the compression means 15 comprise an external compression element 41, supported by the supporting element 40.

Preferably, the compression element 41 is an idle roller which rotates about its own axis.

According to an example, the element 41 is heated by suitable heating means (not illustrated).

The heated compression element 41 comes into contact with and compresses the edges 51, 52 of the cut pipe to eliminate the lips due to the cutting action and restore the original dimensions of the pipe T.

According to another aspect, the supporting element 40 comprises contact means, configured to keep the compression element 41 in contact with the surface of the pipe T during cutting.

Preferably, the contact means comprise one or more elastic elements, for example a spring, which applies an elastic action on the compression element 41 (operating preferably by compression).

Figure 6:
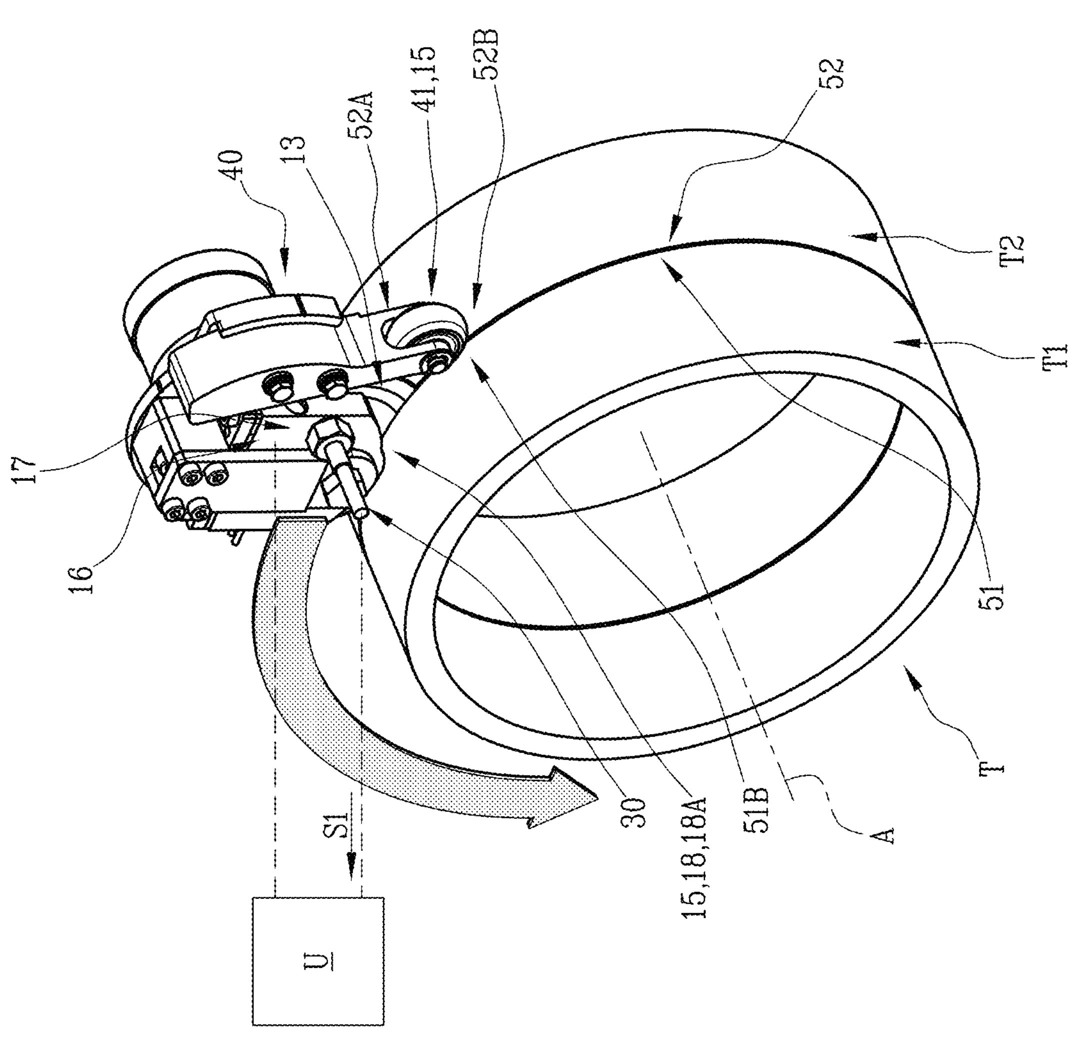

According to an embodiment, illustrated for example in FIG. 6, the compression means 15 comprise both the compression element 41 and the flanges 18.

According to this embodiment, the compression element 41 acts, in different portions of edge 51, 52 of the pipe, simultaneously with the heated flanges 18.

Generally speaking, the flanges 18 and/or the compression element 41 may be heated by conduction (by means of fixed bodies—illustrated and indicated as 17 for the flanges 18—which transfer heat to them), or, in example not illustrated, the compression means 15 may be heated by induction or by irradiation.

If the compression means 15 are heated by induction the means 15 comprise ferromagnetic material and the rotation unit 12 comprises at least one induction coil, configured to generate electromagnetic induction on the compression means 15.

The cutting tool 13 rolls with the heated flanges 18 in forced contact with the surface of the pipe T, if necessary deformed by the cut itself compressing, with a mechanical and thermal action, the deformations which the pipe has undergone following the cutting action and restoring the original dimensions of the pipe T not cut at the edge.

As mentioned, in order for the cut to be of good quality, the cutting plane must always be perpendicular with respect to the axis A of the pipe T.

The axial rigidity of the cutting tool 13 is therefore essential to prevent that its bending, during the penetration action, translates into a non-perpendicular cutting plane.

This is particularly important for pipes made of thermoplastic materials (such as PVC-U, ABS and PMMA) which have a fragile type mechanical behaviour and a particularly high hardness.

As already mentioned, however, the rigidity of the cutting tool 13 is closely linked to its thickness.

According to the embodiment of the knife tool 13, it is not possible to fall below a limit thickness value of tool 13, without a minimum rigidity, to prevent non-perpendicular cuts and/or early breakages of the tool 13.

It should also be considered that it is precisely the thickness of the cutting tool 13 which determines the extent of the deformations induced on the pipe T and the dimensions of the lips produced.

Increasing, therefore, the thickness of the tool 13, in favour of its rigidity, results in greater lips and deformations on the pipe T.

Using an idle disc cutting tool 13 allows, advantageously, the deformations to be limited and the extent of the lips to be reduced.

Advantageously, the disc shape of the cutting tool 13 with respect to a knife blade makes it possible (with the same bending rigidity) to effectively reduce its thickness and to therefore considerably limit the unwanted formation of swellings and lips at the cutting plane of the pipe T.

The cutting action comprises in this case a radial feed motion and rotation of the tool 13 about the axis A of the pipe T as for the usual knife blade, to which is added a rotational motion of the disc tool about the relative axis A2.

The friction which is generated between the disc-shaped cutting tool 13 and the surface of the pipe T is of the rolling type, all with the advantage of a reduced coercive action on the material of the pipe T during the penetration.

It should be noted, however, that using a thin disc blade reduces but does not eliminate the deformation effect (e.g. lipping) induced on the surfaces of the pipe T due to the penetration of the cutting tool 13.

In this context, it is the heated compression means 15 (in the form of flanges 18 and/or in the form of a compression element 41) which act further on the surface of the pipe T during the final step of the cutting process, re-compressing mechanically and thermally any lips and swellings produced by the cutting tool 13.

According to a preferred embodiment, the rotation unit 12 comprises at least one temperature sensor 30 configured for measuring a temperature value and generating a signal S1 representing the temperature value of the heating means 16.

It should be noted that the heating means 16 bring the compression means 15 to the predetermined temperature and it is therefore essential to monitor the temperature of the heating means 16.

The apparatus comprises a control unit U in communication at least with the temperature sensor 30 and with the heating means 16, as illustrated in FIGS. 5 and 6.

The control unit U is configured to receive the signal S1 and control the heating means 16 as a function of the signal S1.

In other words, the unit U receives the signal S1 from the sensor 30 and on the basis of this signal controls the operating temperature of the heating means 16, for example, controlling the activation or regulating the power.

Controlling the operating temperature of the heating means 16 indirectly involves controlling the temperature of the flanges 18.

In effect, advantageously, the temperature sensor 30, in conjunction with the unit U, allows the heating means 16 to be kept at a predetermined temperature.

Preferably, the temperature sensor 30 is a thermocouple.

According to a further embodiment not illustrated, the temperature sensor 30 directly measures the temperature of the compression means 15, using, for example, a pyrometer type sensor.

According to an aspect, the invention relates to a method for cutting a thermoplastic pipe T.

The method comprises the steps of:

locking the thermoplastic pipe T along a first direction, preparing a cutting tool 13 and the compression means 15 associated with the cutting tool 13, moving the cutting tool 13 radially with respect to the thermoplastic pipe T and rotating the cutting tool 13 about an axis A of the thermoplastic pipe T for cutting the thermoplastic pipe T, heating to a predetermined temperature the compression means 15 associated with the cutting tool 13, rotating about the axis A of the pipe T the heated compression means 15 for compressing an edge 51, 52 of the cut pipe.

The term edge 51, 52 of the cut pipe means the edge of the pipe T at which the cut is made.

Advantageously, heating the compression means 15 makes it possible to make a better compression and eliminate the lips due to cutting of the pipe T, restoring the integrity of the edges and the original dimensions of the pipe.

According to an embodiment, the method comprises a step of heating the compression means 15 by irradiation or by magnetic induction.

According to an embodiment, the method comprises a step of preparing compression means 15 comprising flanges 18 and heating the flanges 18 to the predetermined temperature.

Preferably, the step of heating the flanges 18 to the predetermined temperature comprises a step of heating the flanges 18 to a temperature preferably between 50° and 200°, depending on the type of thermoplastic material of the pipe T.

Advantageously, heating the compression means 18 makes it possible to make a better compression and eliminate the lips due to cutting of the pipe T, restoring the integrity of the edges of the pipe.

According to an embodiment, the method comprises a step of preparing heating means 16 coupled to the compression means 15.

The step of heating the compression means 15 associated with the cutting tool 13 to a predetermined temperature comprises a step of activating the heating means 16 for heating the compression means 15 to the predetermined temperature.

According to an embodiment, the step of preparing heating means 16 comprises a step of preparing fixed heating bodies 17 coupled to the flanges 18 to transfer heat by conduction.

The step of heating the flanges 18 to the predetermined temperature comprises a step of sliding the flanges 18 and the fixed heating bodies 17.

Advantageously, sliding the flanges 18 and the fixed heating bodies 17 allows the flanges 18 to be heated by conduction, to allow heat to be transferred from the fixed heating bodies 17 to the flanges 18.

According to an embodiment, the step of preparing compression means 15 comprises a step of preparing a compression element 41.

According to an embodiment, the method comprises a step of rotating about the axis A of the pipe T the compression element 41, to compress the edge 51, 52 of the cut pipe T.

According to an embodiment, the step of rotating about the axis of the pipe the heated compression means 15 for compressing an edge 51, 52 of the cut pipe T comprises, simultaneously, a step of rotating about the axis A of the pipe the flanges 18, to compress a first edge portion 51A, 52A of the cut pipe, and a step of rotating the compression element 41 about the axis A of the pipe T, to further compress, simultaneously, the edge 51, 52 of the cut pipe T, at a second edge portion 51B, 52B.

In short, therefore, providing a cutting tool 13 with heated compression means 15 significantly improves the quality of the cutting by separation of material of a pipe T, effectively eliminating the limits of the cutting by separation of material (which advantageously does not produce dust and swarf), that is to say, the generation of lips and deformations on the surface of the pipe T at the cutting plane, especially for thermoplastic pipes with a fragile behaviour but a high hardness.

The invention claimed is:

1. An apparatus for cutting a thermoplastic pipe, comprising:

- at least one guide for movement along a predetermined direction;
- a unit mobile along said guide, with respect to the predetermined direction;
- a first actuator, configured for moving the mobile unit along the guide, the mobile unit comprising:
- a rotation unit, configured to rotate about a thermoplastic pipe;
- a second actuator, configured for rotating the rotation unit about the thermoplastic pipe;
- at least one locking unit, provided with gripping elements interacting with the thermoplastic pipe and movable between an open configuration and a closed configuration, said gripping elements and rotation unit being coupled to allow, in the closed configuration, longitudinally constraining of the rotation unit to the pipe along the predetermined direction;
- a cutting tool, carried by the rotation unit, for cutting the thermoplastic pipe, the cutting tool being configured to move radially with respect to the thermoplastic pipe;
- a third actuator, carried by the rotation unit, operating on the cutting tool to move it radially with respect to the thermoplastic pipe;
- compression means, configured for acting mechanically on, that is to say, locally deforming, a cut edge of the thermoplastic pipe in such a way as to substantially eliminate any deformations caused by the cutting action; means for heating said compression means configured for heating the compression means to a predetermined temperature.

2. The apparatus according to claim 1, wherein the compression means are associated with the cutting tool and placed alongside said cutting tool.

3. The apparatus according to claim 1, wherein said compression means comprise flanges.

4. The apparatus according to claim 3, wherein each flange has a truncated cone shape with the larger base facing towards the cutting tool.

5. The apparatus according to claim 1, wherein the compression means comprise a supporting element configured to support the cutting tool.

6. The apparatus according to claim 5, wherein the compression means comprise a compression element supported by said supporting element.

7. The apparatus according to claim 1, wherein the heating means comprise fixed heating bodies, said fixed bodies being coupled to the flanges and being configured for heating said flanges to the predetermined temperature.

8. The apparatus according to claim 7, wherein said fixed bodies are configured for heating said flanges by conduction.

9. The apparatus according to claim 7, wherein each fixed body comprises an electrical resistance.

10. The apparatus according to claim 1, comprising a temperature sensor configured to measure a temperature value and to generate a signal signifying the temperature value, said apparatus comprising a control unit in communication at least with said temperature sensor and with said heating means, the control unit being configured to receive the signal and to control the heating means as a function of the signal.

11. The apparatus according to claim 1, wherein the cutting tool is an idle rotary disc blade.

12. A method for cutting a thermoplastic pipe comprising the steps of:

- locking the thermoplastic pipe along a first direction,
- preparing a cutting tool and compression means associated with said cutting tool for acting mechanically, that is to say, locally deforming a cut edge of the thermoplastic pipe,
- moving the cutting tool radially with respect to the thermoplastic pipe and rotating the cutting tool about an axis of the thermoplastic pipe for cutting the thermoplastic pipe,
- heating to a predetermined temperature the compression means associated with the cutting tool,
- rotating about the axis of the pipe the heated compression means for deforming the edge of the cut thermoplastic pipe in such a way as to eliminate any deformations caused by the cutting action.

13. The cutting method according to claim 12, comprising a step of preparing compression means comprising flanges and heating said flanges to a predetermined temperature.

14. The cutting method according to claim 12, comprising a step of preparing heating means coupled to said compression means, the step of heating the compression means associated with the cutting tool to a predetermined temperature comprising a step of activating the heating means to heat the compression means to the predetermined temperature.

15. The cutting method according to claim 13, wherein the step of preparing heating means comprises a step of preparing fixed heating bodies coupled to said flanges for transferring heat by conduction, the step of heating said flanges to the predetermined temperature comprising a step of sliding said flanges and said fixed heating bodies, to allow a heat transfer from the fixed heating bodies to the flanges.

16. The method according to claim 12, wherein the step of preparing compression means comprises a step of preparing a compression element associated with a supporting element which is operatively connected to the cutting tool.

17. The method according to claim 16, wherein the step of rotating about the axis of the pipe the heated compression means to compress an edge of the thermoplastic pipe comprises a step of rotating about the axis of the pipe the heated compression element to compress the edge of the cut pipe T.

18. The method according to claim 16, wherein the step of rotating about the axis of the pipe the heated compression means to compress an edge of the cut thermoplastic pipe comprises, simultaneously, a step of rotating about the axis of the pipe the flanges, to compress a first edge portion of the cut pipe, and a step of rotating the compression element about the axis of the thermoplastic pipe, to further compress the edge of the cut thermoplastic pipe, at a second edge portion of the cut thermoplastic pipe.

19. The method according to claim 13, wherein the step of preparing a cutting tool and compression means associated with said cutting tool comprises a step of preparing a cutting tool of the idle rotary disc type.

* * * * *